United States Patent
Mattar et al.

(10) Patent No.: US 7,726,201 B2
(45) Date of Patent: Jun. 1, 2010

(54) TRIPLE REDUNDANCY VORTEX FLOWMETER SYSTEM

(75) Inventors: Wade M. Mattar, Wrentham, MA (US); Harry William Des Rosiers, Attleboro, MA (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 12/195,138

(22) Filed: Aug. 20, 2008

(65) Prior Publication Data

US 2009/0049926 A1 Feb. 26, 2009

Related U.S. Application Data

(60) Provisional application No. 60/957,400, filed on Aug. 22, 2007.

(51) Int. Cl.
*G01F 1/32* (2006.01)
(52) U.S. Cl. .................................. 73/861.24
(58) Field of Classification Search ............. 73/861.24, 73/861.22, 861.47
See application file for complete search history.

(56) References Cited

U.S. PATENT DOCUMENTS

| 4,275,602 | A | * | 6/1981 | Fujishiro et al. | 73/861.22 |
| 5,583,300 | A | * | 12/1996 | Green et al. | 73/861.24 |
| 7,258,024 | B2 | * | 8/2007 | Dimarco et al. | 73/861.22 |

OTHER PUBLICATIONS

PCT/US08/74006 International Search Report and Written Opinion, PCT, Oct. 22, 2008.
International Preliminary Report on Patentability for International Application No. PCT/US2008/074006, dated Feb. 24, 2010, 6 pages.

* cited by examiner

*Primary Examiner*—Jewel Thompson
(74) *Attorney, Agent, or Firm*—Fish & Richardson P.C.

(57) ABSTRACT

A system includes a first shedder that is at least partially disposed in a fluid conduit and that generates vortices within the fluid conduit, a first flow sensor system that is responsive to the vortices generated by the first shedder and a second flow sensor system that is responsive to the vortices generated by the first shedder. The system further includes a second shedder that is at least partially disposed in the fluid conduit, that generates vortices within the fluid conduit, and that is separated from the first shedder by a distance. A third flow sensor system is responsive to the vortices generated by the second shedder.

20 Claims, 2 Drawing Sheets

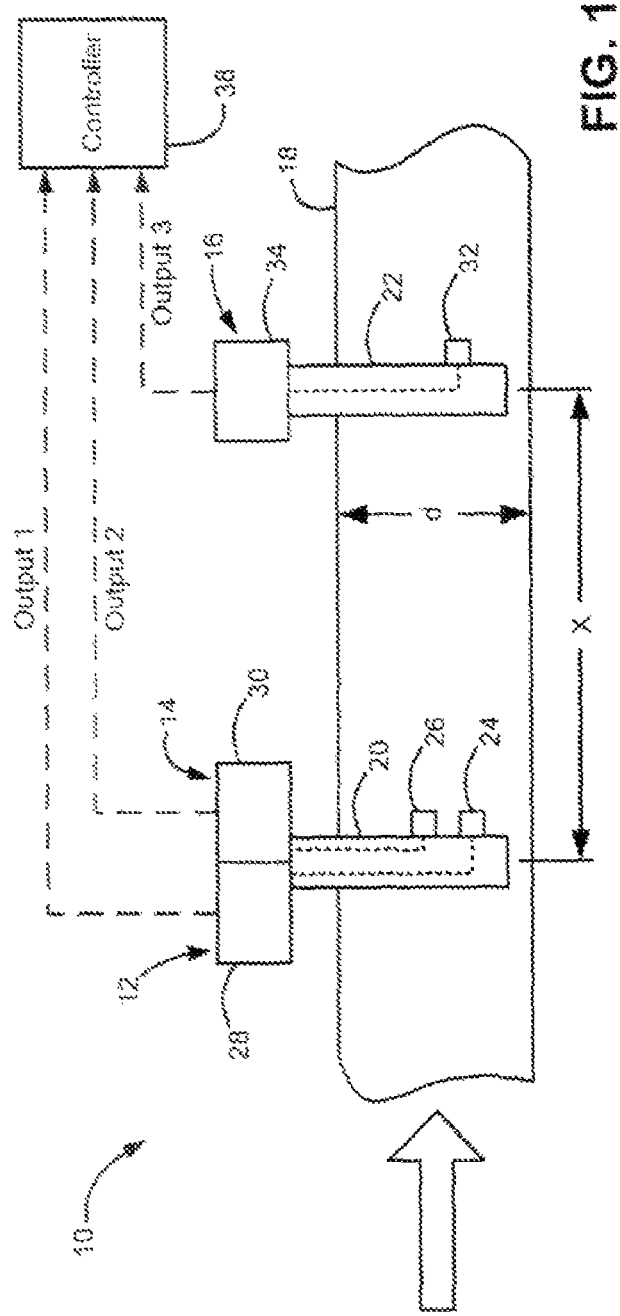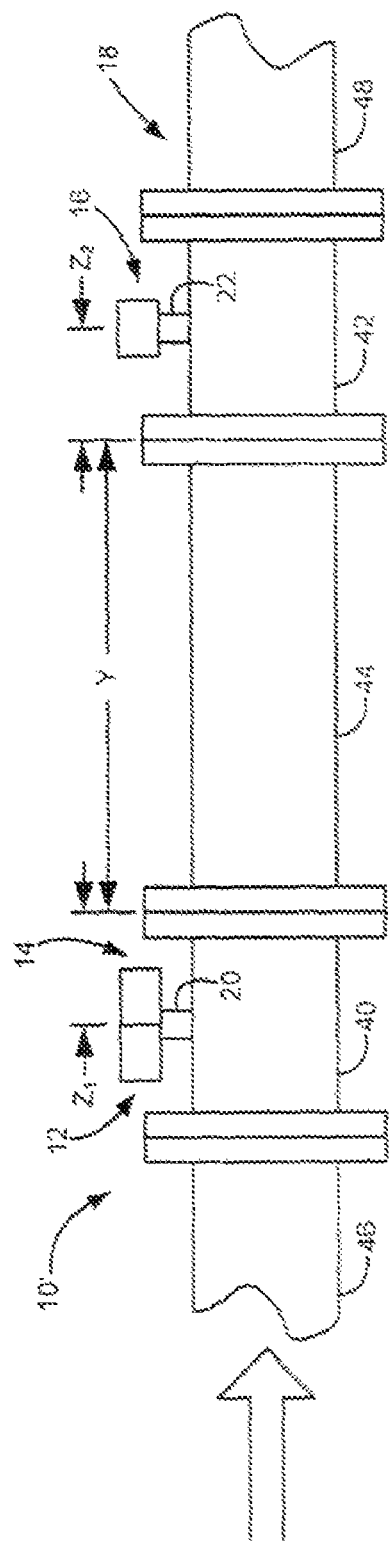

TRIPLE REDUNDANCY VORTEX FLOWMETER SYSTEM

CROSS-REFERENCE TO RELATED APPLICATIONS

This application claims priority to U.S. Provisional Patent Application Ser. No. 60/957,400, filed on Aug. 22, 2007, the disclosure of which is expressly incorporated herein in its entirety.

TECHNICAL FIELD

The present disclosure relates to measuring the rate of flow of a fluid, and more particularly to a flowmeter system for measuring the rate of flow of a fluid.

BACKGROUND

Flow meters may measure the rate of flow of a fluid in a pipe or other pathway. The fluid may be, for example, a gas or a liquid, and may be compressible or incompressible. One type of flow meter is a vortex flow meter which is based on the principle of vortex shedding. Vortex shedding refers to a natural process in which a fluid passing a bluff body causes a boundary layer of slowly moving fluid to be formed along the surface of the bluff body. A low pressure area is created behind the bluff body and causes the boundary layer to roll up, which generates vortices in succession on opposite sides of the bluff body. The vortices induce pressure variations that may be sensed by a pressure sensor. The vortex-shedding pressure variations have a frequency that is related, to the flow rate. Accordingly, by measuring the frequency of the pressure variations, the flow rate may be determined.

SUMMARY

According to one general aspect, a system includes a first shedder that is at least partially disposed in a fluid conduit and that generates vortices within the fluid conduit, a first flow sensor system that is responsive to the vortices generated by the first shedder and a second flow sensor system that is responsive to the vortices generated by the first shedder. The system further includes a second shedder that is at least partially disposed in the fluid conduit, that generates vortices within the fluid conduit, and that is separated from the first shedder by a distance. A third flow sensor system is responsive to the vortices generated by the second shedder.

In another aspect, the first and second sensor systems are arranged in parallel.

In another aspect, the distance is a multiple of a diameter of the fluid conduit.

In other aspects, the fluid conduit includes a plurality of assembled conduit sections, wherein the first and second flow sensor systems and the first shedder are associated with a first conduit section, and the third flow sensor system and second shedder are associated with a second conduit section.

In still other aspects, a controller monitors performance of the system based on flow rate values that are generated based on respective signals of the first, second and third flow sensor systems. The controller generates at least one of a report and a service request based on the respective signals of the first, second and third flow sensor systems.

In yet other aspects, the first, second and third flow sensor systems are optimized for respective first, second and third flow rate ranges, wherein one of the first, second and third flow sensor systems has priority when a flow rate is in the respective first, second or third flow rate range.

According to another general aspect, a method includes generating vortices in a fluid flow within a fluid conduit using a first shedder that is at least partially disposed in the fluid conduit, inducing a response in a first flow sensor system based on the vortices generated by the first shedder, and inducing a response in a second flow sensor system based on the vortices generated by the first shedder. In accordance with this general aspect, the method further includes generating vortices in the fluid flow within the fluid conduit using a second shedder that is at least partially disposed in the fluid conduit, the second shedder being separated from the first shedder by a distance, and inducing a response in a third flow sensor system based on the vortices generated by the second shedder.

According to still another general aspect, a system for monitoring a fluid flow rate within a fluid conduit includes a first shedder that is at least partially disposed in a fluid conduit, a first flow sensor system that is responsive to vortices generated by the first shedder in a fluid flow within the fluid conduit, and a second flow sensor system that is arranged in parallel relative to the first flow sensor system, and that is responsive to the vortices generated by the first shedder. In accordance with this general aspect, the system further includes a second shedder that is at least partially disposed in the fluid conduit, and that is separated from the first shedder by a distance, the distance being a multiple of a diameter of the fluid conduit, and a third flow sensor system that is responsive to the vortices generated by the second shedder in the fluid flow within the fluid conduit.

The details of one or more implementations are set forth in the accompanying drawings and the description below. Other features will be apparent from the description and drawings, and from the claims.

DESCRIPTION OF DRAWINGS

FIG. 1 is a schematic illustration of an implementation of a vortex flowmeter system.

FIG. 2 is a schematic illustration of another implementation of a vortex flowmeter system.

DETAILED DESCRIPTION

Figure 3:
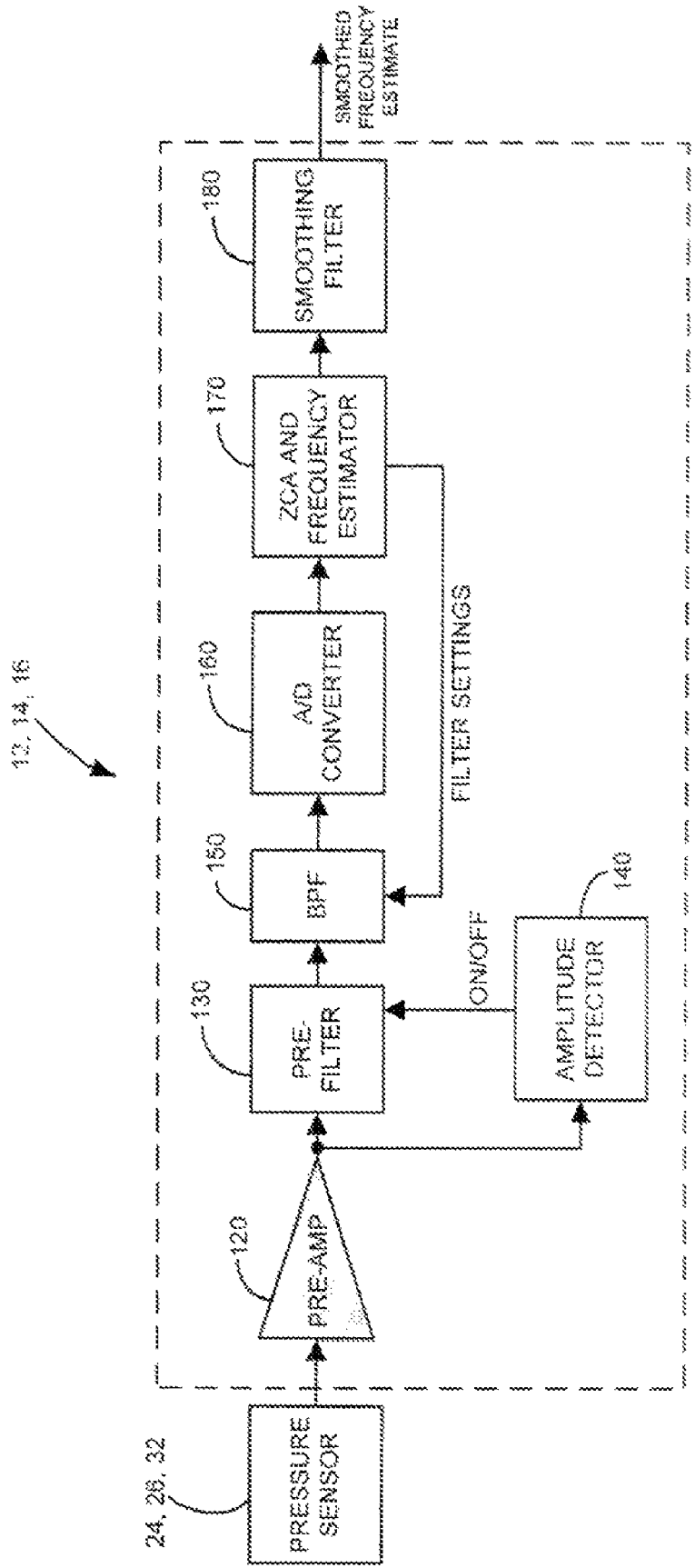
FIG. 3 is a block diagram of an implementation of a vortex flow meter having a pre-filter and an amplitude detector.

Referring to FIG. 1, a vortex flowmeter system 10 is schematically illustrated. The vortex flowmeter system 10 includes first, second and third vortex sensor systems 12, 14, 16, respectively, which are coupled to a conduit or flow path 18. The conduit 18 includes an internal diameter (d). A fluid flows through the conduit 18 in a direction indicated by the arrow (i.e., left, to right, as seen in FIG. 1). Although the third vortex sensor system 16 is illustrated as being downstream of the first and second vortex sensor systems 12, 14, other configurations are within the scope of this disclosure. For example, the third vortex sensor system 16 can be located upstream of the first and second vortex sensor systems 12, 14. In such an exemplary configuration, the fluid would flow from right to left, as seen in FIG. 1.

The first and second vortex sensor systems 12, 14 are arranged in parallel and are associated with a first shedder 20. The third vortex sensor system is associated with a second shedder 22. Exemplary shedders are disclosed in U.S. Pat. Nos. 4,220,046 and 6,615,673, the disclosures of which are incorporated herein by reference. The first and second shedders 20, 22 extend into the conduit 18 and function as vortex-creating obstruction elements and are separated by a distance (X). As fluid passes the first and second shedders 20, 22, disturbances or vortices in the fluid flow are generated, which trail behind each shedder 20, 22. The rate at which the vortices are created is proportional to the flow rate of the fluid. The first and second vortex sensor systems 12, 14 each generate voltage pulses corresponding to the vortices generated by the first shedder 20. Respective frequencies of these voltage pulses are proportional to the fluid flow rate. Similarly, the third vortex sensor system 16 generates voltage pulses corresponding to the vortices generated by the second shedder 22. The frequency of these voltage pulses is proportional to the fluid flow rate. This principle of measuring a fluid flow rate is commonly referred to as the vortex shedding principle.

The first and second vortex sensor systems 12, 14 commonly include the first shedder 20, and each includes respective first and second pressure, sensors 24, 26, respectively, and first and second signal processing modules 28, 30, respectively. The third vortex sensor system 16 includes the second shedder 22, a third pressure sensor 32 and a third signal processing module 34. Each of the first, second and third vortex sensor systems 12, 14, 16 includes an associated mean K-factor, which is generally constant for a given sensor system. The K-factor is typically defined by the number of voltage pulses per volume of fluid flow. The mean K-Factor is the arithmetic mean of the high and low K-factors over a given range of flow rates during flow calibration, furthermore, the flow rate is determined based on the frequency of the voltage pulses (i.e., the vortex frequency) and the K-factor. Because vortex flowmeters are primarily volumetric devices for compressible fluids, the addition of pressure and temperature measurements can be used to determine the fluid density and produce a mass flow measurement.

A distance X is defined between the first and second shedders 20, 22. As illustrated in FIG. 1, the distance X is measured between the centers of the first and second shedders 20, 22. In another implementation, however, the distance X may be defined between the downstream side of the first shedder 20 and the upstream side of the second shedder 22. In still another implementation, the distance X can be defined between the upstream side of the first shedder 20 and the downstream side of the second shedder 22. In other implementations, the distance X can be defined between the respective upstream sides of the first and second shedders 20, 22, or the respective downstream sides of the first and second shedders 20, 22.

The distance X can be determined as multiple of the internal diameter (d) of the conduit. In one implementation, the distance X is equal to or greater than the internal diameter (d) (e.g., 1×d, or 1d). In another implementation, the distance X is equal, to or less than ten times the internal diameter (d) (e.g., 10×d, or 10d). In still another implementation, the distance X is equal to or greater than five times the internal diameter (d) (e.g., 5×d, or 5d) and less than or equal to seven times the internal diameter (d) (e.g., 7×d, or 7d). In this case, the distance X is within a range defined between 5d and 7d. A minimum distance $X_{MIN}$ is determined to prevent degraded performance in the downstream vortex sensor system 16.

The vortex flowmeter system 10 can also include a controller 38. The controller 38 receives output signals from the respective first, second and third vortex sensor systems 12, 14, 16. In one implementation, the output signals include frequency estimates, which correspond to the fluid flow rate as detected by the respective vortex sensor systems 12, 14, 16. In this case, the controller 38 internally converts the frequency estimates to fluid flow rate signals for comparison purposes. In another implementation, the output signals include fluid flow rate signals. In this case, the vortex sensor systems 12, 14, 16 convert their respective frequency estimates to fluid flow rate signals and the controller 38 is not required to perform this conversion.

Referring to FIG. 2, another implementation of a vortex flowmeter system 10' is schematically illustrated. In this implementation, the conduit 18 includes a plurality of conduit sections that are joined to define a continuous flow path. More specifically, first and second flanged flow sensor conduits 40, 42 are included and define respective flow path segments. A flanged intermediate conduit 44 is assembled between the first and second flanged flow sensor conduits 40, 42, and defines a flow path segment. Flanged end conduits 46, 48 are located at the ends of the assembled first and second flanged flow sensor conduits 40, 42 and the intermediate conduit 44. The flanged end conduits 46, 48 define respective flow path segments. The first and second vortex flow sensor systems 12, 14 are assembled with the first flow sensor conduit 40, such that the first shedder 20 extends into the flow path segment. Similarly, the third vortex flow sensor system 16 is assembled with the second flow sensor conduit 42, such that the shedder 22 extends into the flow path segment.

The flanged intermediate conduit 44 includes a conduit length Y. Distances $Z_1$ and $Z_2$, respectively, are defined between the ends of the flanged intermediate conduit 44 and the first and second shedders 20, 22. As illustrated in FIG. 2, the distances $Z_1, Z_2$ are defined between the respective ends of the flanged intermediate conduit 44 and the centers of the first and second shedders 20, 22. In another implementation, however, the distances $Z_1, Z_2$ can be defined between respective ends of the flanged intermediate conduit 44 and either the upstream or downstream sides of the first and second shedders 20, 22. In the case of the implementation of FIG. 2, the distance X can be defined as the sum of the distances Y, $Z_1$ and $Z_2$ (i.e., $X=Y+Z_1+Z_2$).

As discussed above, the distance X can be determined as a multiple of the internal diameter (d) of the conduit. In one implementation, the distance X is equal to or greater than the internal diameter (d) (e.g., 1×d, or 1d). In another implementation, the distance X is equal to or less than ten times the internal diameter (d) (e.g., 10×d, or 10d). In still another implementation, the distance X is equal to or greater than five times the internal diameter (d) (e.g., 5×d, or 5d) and less than or equal to seven times the internal diameter (d) (e.g., 7×d, or 7d). In this case, the distance X is within a range defined between 5d and 7d. For example, the conduit length Y can be equal to 5d, and the sum of $Z_1$ and $Z_2$ is equal to or less than 2d.

Referring to FIG. 3, exemplary sub-modules that are included in the signal processing modules of the vortex sensor system are illustrated. The exemplary sub-modules are disclosed in commonly assigned U.S. Pat. No. 6,832,179, the disclosure of which is expressly incorporated herein by reference. Initially, the pressure sensor 24, 26, 32 is responsive to the pressure of a fluid, which may fluctuate as vortices are generated, and generates a voltage pulse signal based thereon. A pre-amplifier sub-module 120 amplifies the voltage pulse signal and outputs an amplified voltage pulse signal to both a pre-filter sub-module 130 and an amplitude detector sub-module 140. If the pre-filter sub-module 130 is enabled, it filters the input signal to remove noise. If the pre-filter sub-module 130 is not enabled, the pre-filter sub-module 130 passes the signal through without filtering. The amplitude detector sub-module 140 detects the amplitude of the amplified voltage pulse-signal and enables the pre-filter sub-module 130, if the detected amplitude is below a threshold value.

Consequently, the output of the amplitude detector sub-module 140 provides an ON/OFF signal to the pre-filter sub-module 130. The output of the pre-filter sub-module 130 is provided to a hand-pass filter (BPF) sub-module 150, the output of which is provided to an analog-to-digital (A/D) converter (ADC) sub-module 160. The BPF sub-module 150 filters the input signal to remove noise and the ADC sub-module converts its input signal from analog to digital. The output of the ADC sub-module 160 is provided to a ZCA sub-module 170 that executes a zero crossing algorithm (ZCA) and estimates a frequency of the vortex signal. The ZCA sub-module 170 provides one or more filter settings to the BPF sub-module 150. The output of the ZCA sub-module 170 is provided to a smoothing filter sub-module 180. The smoothing filter sub-module 180 produces a smoothed frequency estimate and may be coupled to a flow estimator sub-module (not shown) that estimates the flow rate of the fluid based on the frequency of the smoothed frequency estimate.

The assembled vortex flowmeter system 10, 10' is initially calibrated. The calibration process includes generating a known flow rate or a range of known flow rates through the conduit 18 and recording output signals from the first, second and third vortex flow sensor systems 12, 14, 16. In one implementation, the output signals include the respectively measured flow rates. Because a known flow rate is implemented, the flow rate measurements of the individual vortex flow sensor systems 12, 14, 16 can be compared to the known flow rate. If a measured flow rate is not equal to the known flow rate, the difference between the measured flow rate and the known flow rate can be provided as a flow rate offset for the particular vortex flow sensor system 12, 14, 16. During subsequent use of the vortex flowmeter system 10, 10', the flow rate is measured and the offset is applied to provide a final measured flow rate from the particular vortex flow sensor system. Consequently, each of the first, second and third vortex flow sensor systems 12, 14, 16 can include it's own unique flow rate offset.

In another implementation, the output signals include respective K-factor values, which are back-calculated based on the respectively measured flow rates. Because a known flow rate is implemented, a target K-factor value can be back-calculated for each of the vortex flow sensor systems 12, 14, 16. The measured K-factor values of the individual vortex flow sensor systems 12, 14, 16 can be compared to the respective target K-factor values. If a measured K-factor is not equal to the respective target K-factor value, the difference between the measured. K-factor value and the respective target K-factor value can be provided as a K-factor offset for the particular vortex flow sensor system 12, 14, 16. During subsequent use of the vortex flowmeter system 10, 10', the measured flow rate is calculated by the respective signal processing modules, which account for the K-factor offset. Consequently, each of the first, second and third vortex flow sensor systems 12, 14, 16 can include it's own unique K-factor offset.

The controller 38 monitors the performance of the vortex flowmeter system 10, 10' based on the measured fluid flow rate values $FR_1$, $FR_2$, $FR_3$ generated by the vortex flow sensor systems 12, 14, 16, respectively. The controller 38 can generate control signals based on one or more of outputs of the vortex flow sensor systems 12, 14, 16. The controller 38 can generate a report or service request based on the output signals. Further, the controller 38 can process the output signals to identify a faulty vortex flow sensor system and/or to identify a faulty component within the individual vortex flow sensor systems.

In some implementations, if the fluid flow rate values $FR_1$, $FR_2$, $FR_3$ are equivalent or within a threshold percentage difference, the vortex flowmeter system 10, 10' is deemed to be operating normally. In another implementation, a mean fluid flow rate value MFR is determined based on the fluid flow rate values $FR_1$, $FR_2$, $FR_3$ generated by the vortex flow sensor systems 12, 14, 16. Each of the fluid flow rate values $FR_1$, $FR_2$, $FR_3$ is compared to the mean fluid flow rate value $FR_M$. If the difference $\Delta FR$ between a fluid flow rate value $FR_1$, $FR_2$, $FR_3$ and the mean fluid flow rate value $FR_M$ is less than a threshold difference $\Delta FR_{THR}$, the particular vortex flow sensor system is deemed to be operating normally. If the difference $\Delta FR$ between a fluid flow rate value $FR_1$, $FR_2$, $FR_3$ and the mean fluid flow rate value $FR_M$ is greater than the threshold difference $\Delta FR_{THR}$, the particular vortex flow sensor system may be deemed to be operating abnormally. If one or more vortex flow sensor systems is operating abnormally, a report and/or service request can be automatically generated. Further, a faulty component or components within an abnormally operating vortex flow sensor system can be automatically identified in an effort to pinpoint the source of the fault and more rapidly correct the fault.

In other implementations, the first, second and third vortex flow sensor systems 12, 14, 16 can each be optimized for respective flow rate ranges. For example, for a first flow rate range, the output of the first vortex flow sensor system 12 can have the highest priority. For a second flow rate range, the output of the second vortex flow sensor system 14 can have the highest priority, and for a third flow rate range, the output of the third vortex flow sensor system 16 can have the highest priority. If there is a disagreement in the measured fluid flow rate values $FR_1$, $FR_2$, $FR_3$, the measured flow rate value having the highest priority for the particular flow rate range is used for control purposes.

In still other implementations, a voting scheme is implemented in the ease of a disagreement between the outputs of the first, second and third vortex flow sensor systems 12, 14, 16. For example, two outputs of the vortex flow sensor systems may correlate to one another, while the third output does not correlate to the others. In such a ease, the flow rate value of the two correlating outputs is used.

A number of implementations have been described. Nevertheless, it will be understood that various modifications may be made. Accordingly, other implementations are within the scope of the following claims.

What is claimed is:

1. A system, comprising:
   a first shedder that is at least partially disposed in a fluid conduit and that generates vortices based on a fluid flow within the fluid conduit;
   a first flow sensor system that is responsive to the vortices generated by the first shedder;
   a second flow sensor system that is responsive to the vortices generated by the first shedder;
   a second shedder that is at least partially disposed in the fluid conduit, that generates vortices based on a fluid flow within the fluid conduit, and that is downstream of the first shedder and separated from the first shedder by a distance; and
   a third flow sensor system that is responsive to the vortices generated by the second shedder.

2. The system of claim 1, wherein the first and second sensor systems are arranged in parallel.

3. The system of claim 1, wherein the distance is a multiple of a diameter of the fluid conduit.

4. The system of claim 1, wherein the fluid conduit includes a plurality of assembled conduit sections, and wherein the first and second flow sensor systems and the first shedder are associated with a first conduit section, and the third flow sensor system and second shedder are associated with a second conduit section.

5. The system of claim 1, further comprising a controller that monitors performance of the system based on flow rate values that are generated based on respective signals of the first, second and third flow sensor systems.

6. The system of claim 5, wherein the controller generates at least one of a report and a service request based on the respective signals of the first, second and third flow sensor systems.

7. The system of claim 1, wherein the first, second and third flow sensor systems are optimized for respective first, second and third flow rate ranges, and wherein one of the first, second and third flow sensor systems has priority when a flow rate is in the respective first, second or third flow rate range.

8. A method, comprising:
    generating vortices in a fluid flow within a fluid conduit using a first shedder that is at least partially disposed in the fluid conduit;
    inducing a response in a first flow sensor system based on the vortices generated by the first shedder;
    inducing a response in a second flow sensor system based on the vortices generated by the first shedder;
    generating vortices in the fluid flow within the fluid conduit using a second shedder that is at least partially disposed in the fluid conduit, the second shedder being downstream of the first shedder and separated from the first shedder by a distance; and
    inducing a response in a third flow sensor system based on the vortices generated by the second shedder.

9. The method of claim 8, further comprising arranging the first and second sensor systems in parallel.

10. The method of claim 8, wherein the distance is a multiple of a diameter of the fluid conduit.

11. The method of claim 8, further comprising assembling the fluid conduit from a plurality of conduit sections, wherein the first and second flow sensor systems and the first shedder are associated with a first conduit section, and the third flow sensor system and second shedder are associated with a second conduit section.

12. The method of claim 8, further comprising monitoring performance of the first, second and third flow sensor systems based on flow rate values that are generated based on respective signals of the first, second and third flow sensor systems.

13. The method of claim 12, further comprising generating at least one of a report and a service request based on the respective signals of the first, second and third flow sensor systems.

14. The method of claim 8, further comprising optimizing the first, second and third flow sensor systems for respective first, second and third flow rate ranges, wherein one of the first, second and third flow sensor systems has priority when a flow rate is in the respective first, second or third flow rate range.

15. A system for monitoring a fluid flow rate within a fluid conduit, comprising:
    a first shedder that is at least partially disposed in a fluid conduit;
    a first flow sensor system that is responsive to vortices generated by the first shedder in a fluid flow within the fluid conduit;
    a second flow sensor system that is arranged in parallel relative to the first flow sensor system, and that is responsive to the vortices generated by the first shedder;
    a second shedder that is at least partially disposed in the fluid conduit, and that is downstream of the first shedder and separated from the first shedder by a distance, the distance being a multiple of a diameter of the fluid conduit; and
    a third flow sensor system that is responsive to the vortices generated by the second shedder in the fluid flow within the fluid conduit.

16. The system of claim 15, wherein the fluid conduit includes a plurality of assembled conduit sections, and wherein the first and second flow sensor systems and the first shedder are associated with a first conduit section, and the third flow sensor system and second shedder are associated with a second conduit section.

17. The system of claim 15, further comprising a controller that monitors performance of the system based on flow rate values that are generated based on respective signals of the first, second and third flow sensor systems.

18. The system of claim 17, wherein the controller generates at least one of a report and a service request based on the respective signals of the first, second and third flow sensor systems.

19. The system of claim 17, wherein the controller compares the flow rate values and implements an action based on correlating flow rate values.

20. The system of claim 15, wherein the first, second and third flow sensor systems are optimized for respective first, second and third flow rate ranges, and wherein one of the first, second and third flow sensor systems has priority when a flow rate is in the respective first, second or third flow rate range.

* * * * *